United States Patent [19]

Decker

[11] Patent Number: 4,932,501
[45] Date of Patent: Jun. 12, 1990

[54] OIL METERING SYSTEM

[75] Inventor: David M. Decker, Indianapolis, Ind.

[73] Assignee: General Motors Corporation, Detroit, Mich.

[21] Appl. No.: 332,075

[22] Filed: Apr. 3, 1989

[51] Int. Cl.$^5$ .............................................. F01M 9/10
[52] U.S. Cl. .................... 184/6.11; 184/7.4; 464/7
[58] Field of Search ................ 184/6.11, 7.4, 6, 109; 60/39.08; 464/7, 183

[56] References Cited

U.S. PATENT DOCUMENTS

| | | | |
|---|---|---|---|
| 2,457,999 | 1/1949 | Hulbert | 184/6.11 |
| 2,911,267 | 11/1959 | Small, Jr. | 308/187 |
| 2,999,000 | 9/1961 | Spat | 184/6.11 |
| 3,129,983 | 4/1964 | May et al. | 308/36.1 |
| 3,220,496 | 11/1965 | Beck | 184/6 |
| 3,286,792 | 11/1966 | Wall | 184/6 |
| 3,326,423 | 6/1967 | Clark | 184/6 |
| 3,458,010 | 7/1969 | Smithyman | 184/6 |
| 3,589,471 | 6/1971 | Edge | 184/6 |
| 4,456,041 | 6/1984 | Grilli et al. | 184/109 |

Primary Examiner—Ira S. Lazarus
Assistant Examiner—Alan Cariaso
Attorney, Agent, or Firm—Saul Schwartz

[57] ABSTRACT

A cylindrical oil distributor insert molded of flexible and resilient fluorocarbon elastomer is self-retaining and self-sealing on an inside cylindrical wall at a hollow end of a rotating shaft. The cylindrical wall of the insert has large and small perforations which define oil catching pockets exposed to an oil spray from a stationary nozzle spraying oil into the hollow end of the shaft. The shaft has drains to each oil catching pocket large enough to exhaust oil from the pockets at rates exceeding the rates at which the pockets capture oil from the spray so that the rates at which the oil is exhausted from the oil catching pockets are proportional to the areas of the pockets exposed to the spray.

3 Claims, 1 Drawing Sheet

OIL METERING SYSTEM

This invention was made under a contract or subcontract of the U.S. Department of Defense.

FIELD OF THE INVENTION

This invention relates to systems for metering oil flow to rotating elements in gas turbine engines.

BACKGROUND OF THE INVENTION

A recognized method for cooling and lubricating gas turbine engine bearings and seal runners includes the steps of spraying oil onto an inside surface of a rotating shaft and conducting the oil to the bearings and seal runners through orifices in the shaft. Forces on the oil resulting from shaft rotation adhere the oil to the shaft as a thin film on the inside surface and motivate the oil through the orifices to the seal runners and the bearings. In practicing this method, several systems have been proposed for metering or distributing the oil between the bearings and seal runners. In one system, the orifices meter the flow. In another system, different sized pockets are formed on the inside surface of the rotating shaft to capture oil in proportion to their areas exposed to the oil spray. In the first mentioned system, the orifices may be so small as to be susceptible to clogging by debris in the oil. In the second mentioned system, difficult machining operations may be required if the pockets are formed directly on the shaft or a weight penalty may be experienced if the pockets are formed on a metal insert installed on the inside surface of the shaft. In the latter arrangement, seal rings between the shaft and the insert are additional parts required to practice the method. A metering system according to this invention implements the aforesaid cooling and lubricating method with a flexible, resilient insert which cooperates with the shaft in defining the oil pockets but which is lighter than prior metal inserts and requires no retention elements and no seal rings.

SUMMARY OF THE INVENTION

This invention is a new and improved oil metering system for conducting oil from a spray inside a rotating shaft to rotating elements on the shaft. The metering system according to this invention includes a cylindrical insert molded of resilient and flexible fluorocarbon elastomer and including a plurality of different sized perforations in the wall of the cylinder. The outside diameter of the insert is greater than the inside diameter of the shaft so that the insert is self-retaining. In addition, the resilience of the insert presses the outside thereof against the inside of the shaft so that the insert is self-sealing against the shaft around oil catching pockets defined by the perforations in the cylindrical wall of the insert. To prevent torsional distortion of the insert during shaft rotation, molded lugs on the insert engage appropriate receptacles on the shaft.

DESCRIPTION OF A PREFERRED EMBODIMENT

Figure 1:
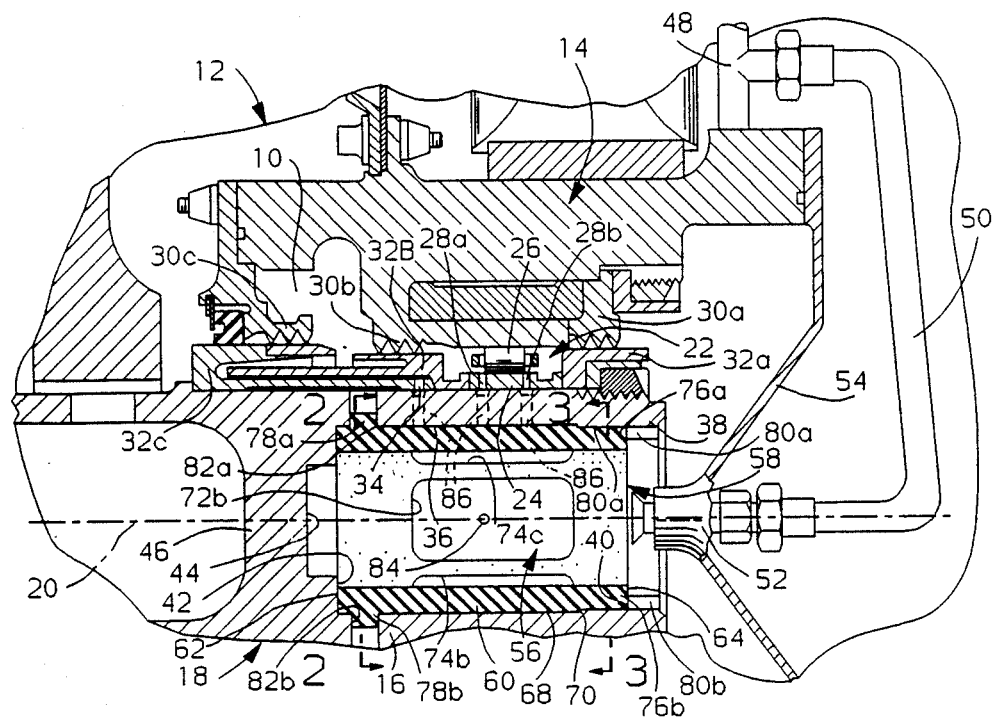
FIG. 1 is a fragmentary sectional view of a gas turbine engine having a rotating shaft and an oil metering system according to this invention.

Referring to FIG. 1, an end bearing sump 10 of a fragmentarily illustrated gas turbine engine 12 is defined radially inboard of a rigid annular sump housing 14 and radially outboard of a hollow or tubular end 16 of a rotor shaft 18 of the engine. The tubular end of the rotor shaft is supported on the sump housing 14 for rotation about a main axis 20 of the engine by a roller bearing 22. The bearing 22 includes an inner race 24 rotatable with the shaft 18 and a plurality of rollers, only a single roller 26 being illustrated in FIG. 1. The inner race 24 has a pair of oil passages 28a-b on opposite sides of the rollers. The sump housing 14 carries a plurality of windback seals 30a-c which cooperate with a corresponding plurality of seal runners 32a-c rotatable with the shaft 18. The seal runner 32c has an oil passage 34 therethrough.

The tubular end 16 of the rotor shaft 18 has an inside cylindrical wall 36 centered on the main axis 20. The inside wall 36 is bounded at the end of the shaft by a circumferential lip 38 which has an annular shoulder 40 facing the inside wall. At the other end, the inside wall 36 is bounded by an annular shoulder 42 between the wall 36 and a cavity 44 in a solid web 46 of the shaft.

The oil distribution system of the engine includes a pipe 48 carrying oil under pressure when the engine is operating. A pipe 50 branches from the pipe 48 and terminates at a nozzle 52 formed integrally with an end plate 54 attached to the sump housing 14. The pipe 50 conducts oil under pressure to the nozzle 52 which has an orifice, not shown, adapted to direct a spray of oil toward the inside cylindrical wall 36 of the rotating shaft 18. The nozzle 52 limits the flow of oil toward the inside wall 36 to a rate equal to the combined rates required to lubricate and cool the bearing 22 and to cool the seal runners 32a-c. The oil spray is divided between the bearing and the seal runners by a metering system 56 according to this invention.

Referring to FIGS. 1-4, the metering system 56 includes a flow dividing insert 58 molded from flexible and resilient fluorocarbon elastomer such as AMS 3216 manufactured by DuPont and marketed under the trade name Viton. The insert 58 includes a cylindrical wall 60 having an outside diameter greater than the diameter of the inside cylindrical wall 36 of the shaft 18. The left end, FIG. 1, of the insert 58 is bounded by an annular end wall 62 the radial depth or thickness of which is the same as the wall thickness of the cylindrical wall 60. The opposite or right end of the insert is bounded by an annular end wall 64 which extends from the inside diameter of the cylindrical wall 60 to an intermediate cylindrical surface 66, FIG. 4, having a smaller diameter than an outside cylindrical surface 68 of the insert. An annular shoulder 70 extends between the intermediate and outside cylindrical surfaces 66 and 68.

Figure 2:
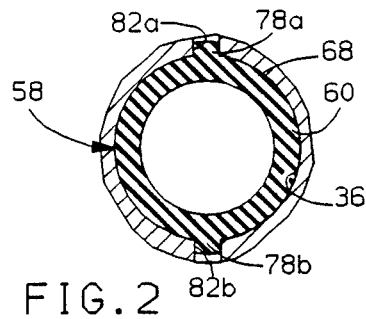
FIG. 2 is a sectional view taken generally along the plane indicated by lines 2—2 in FIG. 1.
Figure 3:
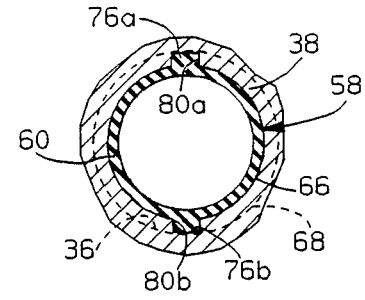
FIG. 3 is a sectional view taken generally along the plane indicated by lines 3—3 in FIG. 1.
Figure 4:
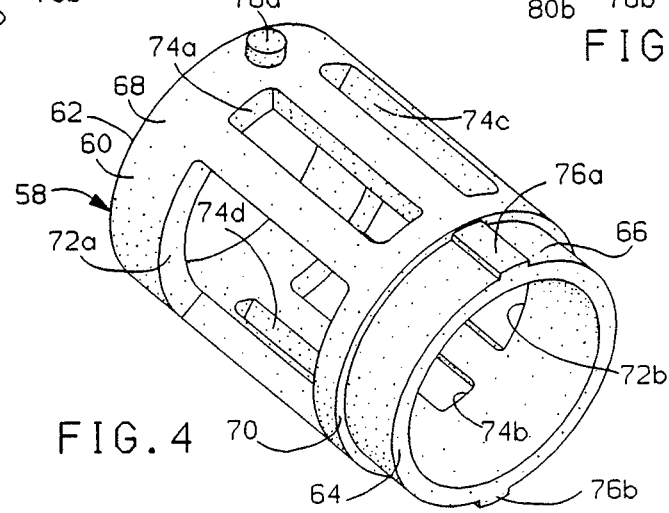
FIG. 4 is a perspective view of a portion of the oil metering system according to this invention.

The cylindrical wall 60 of the insert has a diametrically opposite pair of large perforations 72a-b and two diametrically opposite pairs of small perforations 74a-b and 74c-d between the large perforations, FIG. 4. A first pair of diametrically opposite lugs 76a-b, FIGS. 2 and 4, are formed on the intermediate cylindrical surface 66. A second pair of diametrically opposite lugs 78a-b, FIGS. 1, 3 and 4, are formed on the outside surface 68 of the cylindrical wall 60 near the annular end 62 of the insert.

For installation, the insert 58 is aligned on the main axis 20 outside the hollow end of the shaft 18 and pressed through the circular opening defined by the lip 38. The flexibility and resilience of the insert permits it to be relatively easily pushed through the lip. The insert 58 is rotated relative to the shaft 18 until the lugs 76a–b register with respective ones of a pair of slots 80a–b, FIG. 2, in the lip 38 of the shaft and is pushed to an installed position on the shaft. In the installed position, the end wall 62 seats against the shoulder 42 on the shaft and the annular end wall 64 springs out behind the annular shoulder 40. Concurrently, the lugs 78a–b on the insert seat in corresponding ones of a pair of radial bores 82a–b in the shaft, FIGS. 1 and 3.

In the installed position of the insert 58, FIG. 1, the large and small perforations 72a–b and 74a–d, respectively, cooperate with the inside cylindrical wall 36 of the shaft in defining a plurality of oil catching pockets for capturing oil sprayed from the nozzle 52. For exhausting or draining the pockets, the metering system 56 includes a plurality of drain holes in the shaft within the confines of respective ones of the large perforations and the small perforations, only a single drain hole 84 being illustrated in FIG. 1. The several drain holes are connected to individual ones of the oil passages 28a–b and 34 in the bearing inner race 24 and in the seal runner 32c, as for example by a plurality of schematically represented passages 86, FIG. 1.

When the engine is operating, oil is sprayed from the nozzle 52 at a rate corresponding to the total flow required to cool the seal runners and to cool and lubricate the bearing. The flow capacity of the drain holes in the shaft exceeds the flow from the nozzle 52 so that the drain holes do not meter oil. Rather, the flow rate of oil through the individual drain holes is proportional to the areas of the large and small perforations 72a–b and 74a–d exposed to the spray. Thus, the oil flow to the rotating elements on the shaft connected to the pockets defined by the large perforations exceeds the oil flow to the rotating elements connected to the pockets defined by the small perforations. In addition, lugs 76a–b and 78a–b cooperate with slots 80a–b and the radial bore 82a–b, respectively, to prevent torsional distortion of the insert.

The flexibility and resilience of the insert 58 are important features of this invention. The flexibility permits relatively easy installation. With the outside diameter of the insert 58 greater than the diameter of the inside wall 36 on the shaft 18, the resilience of the insert assures self-retention of the insert on the shaft. Also, the resilience of the insert assures that the insert will self-seal against the inside wall 36 around the large and small perforations to foreclose leakage between the oil catching pockets.

The embodiments of the invention in which an exclusive property or privilege is claimed are defined as follows:

1. In a lubrication system for a gas turbine engine having a rotating shaft with a hollow end and an oil nozzle operative to spray oil into said hollow end,
   a metering system comprising:
   means on said shaft defining an inside cylindrical wall in said hollow end of said rotating shaft,
   a cylindrical insert molded of flexible and resilient fluorocarbon elastomer including a cylindrical wall having a first perforation therein and a second perforation therein and an outside diameter exceeding the diameter of said inside cylindrical wall on said shaft,
   said insert being disposed in said hollow end of said shaft for rotation as a unit therewith and self-retaining on said inside cylindrical wall and self-sealing against said inside cylindrical wall around a first oil catching pocket exposed to said oil spray defined by said first perforation and around a second oil catching pocket exposed to said oil spray defined by said second perforation, and
   means on said shaft defining a first drain from said first oil catching pocket and a second drain from said second oil catching pocket operative to exhaust oil from said first and said second oil catching pockets at rates exceeding the rates at which said first and said second pockets capture oil from said oil spray.

2. The metering system recited in claim 1 and further including
   means on said insert and on said rotating shaft operative to prevent torsional distortion of said insert during rotation of said shaft.

3. The metering system recited in claim 2 wherein said means on said insert and on said rotating shaft operative to prevent torsional distortion of said insert includes
   a plurality of lugs molded integrally with said insert at opposite ends thereof, and
   means defining a corresponding plurality of receptacles on said rotating shaft receiving respective ones of said lugs in said self-retained position of said insert on said shaft.

* * * * *